United States Patent [19]
Zoltán et al.

[11] Patent Number: 5,049,822
[45] Date of Patent: Sep. 17, 1991

[54] METHOD OF AND APPARATUS FOR CARRYING OUT MEASUREMENTS ON OPEN AND CLOSED FRACTURES IN A HARD ROCK FORMATION PIERCED BY A BOREHOLE

[76] Inventors: Barlai Zoltán, Fillér str. 47/B, 1026 Budapest; Dorcsi Géza, Sutemberg tér 6, 5000 Szolnok; Réz Ferenc, Kiss F. str. 4, 1081 Budapest; Ribiczey Péter, VII. Lenin Krt. 20.I.4, 1073 Budapest; Vámos Attila, Batthyany-U.21, 2012 Budakalász, all of Hungary

[21] Appl. No.: 357,065

[22] Filed: May 24, 1989

[30] Foreign Application Priority Data

May 25, 1988 [HU] Hungary ............................. 2658/88
Jan. 15, 1989 [HU] Hungary ............................. 2658/88

[51] Int. Cl.$^5$ ............................................. G01V 3/20
[52] U.S. Cl. ..................................... 324/367; 324/374
[58] Field of Search ............... 324/347, 354, 357, 363, 324/364, 365, 366, 367, 373–375

[56] References Cited

U.S. PATENT DOCUMENTS 2,880,389  3/1959  Ferre et al. ......................... 324/375
2,961,600  11/1960  Tanguy ............................... 324/374
3,798,535  3/1974  Schuster ............................. 324/373
4,282,486  8/1981  Culver et al. ................... 324/375 X Primary Examiner—Reinhard J. Eisenzopf
Assistant Examiner—Warren S. Edmonds
Attorney, Agent, or Firm—Handal & Morofsky

[57] ABSTRACT

A microelectric method and apparatus for recording and differentiating between open and closed fractures along the walls of boreholes is disclosed. A main current and a controlled opposing or bucking current are fed into a hard rock formation in a measurement area of a borehole wall insulated from the drilling mud in the borehole. Within this measurement area absolute potential and potential differences are measured and dimensionless ratios based on the measurements of current and potential are ascertained. The ratios indicate the presence of fractures and allow differentiation between open and closed fractures allowing determination of an open fracture network. The apparatus is made up of at least one measuring pad (6) made of insulating material forced onto the wall of borehole. The measuring pad (6) includes a central measuring electrode (14), a ring shaped outer measuring electrode (13), both connected to potential measuring units (22, 23), and surrounded by a first feeding electrode (9) which is connected to a main current generator (15), two monitoring electrodes (11, 12) connected to the input of a controlled current generator (16) for regulating the bucking current supplied by the second feeding electrode (10) surrounding the monitoring and the first feeding electrodes.

18 Claims, 9 Drawing Sheets

METHOD OF AND APPARATUS FOR CARRYING OUT MEASUREMENTS ON OPEN AND CLOSED FRACTURES IN A HARD ROCK FORMATION PIERCED BY A BOREHOLE

BACKGROUND

The present invention relates to a microelectrical logging method and apparatus for carrying out measurements to differentiate open fractures from closed fractures and to determine the network of the open fractures in hard rocks pierced by a borehole. The method and the apparatus proposed are based on generating microelectric fields that penetrate the wall of the borehole. According to the invention, it is possible to determine the network of the fractures present in a hard rock formation, espeically to differentiate the open fractures constituting passageways connected into a system of communicating vessels showing remarkable hydraulic conductivity from the closed fractures that are permeable from outside of the borehole.

The apparatus and the method of the invention can be applied especially in the petrologic and hydrogeologic investigations and in prospecting sources of useful. minerals.

The determination of the network of the fractures penetrating a hard rock formation pierced by a borehole is a very important object of the geophysical investigations carried out through a borehold. In the hydrogeology, petrology and in the process of displaying the useful minerals the data received in this way are evaluated and processed under geophysical, geologic and mineralogic aspects. The importance of the measurements of such kind follows from the well known fact that the fractures which are present in a hard rock formation may form the path through which water enters mines and causes severe damage to the mines through flooding.

The background art consists of different solutions to the problem mentioned above; the most developed of them may be identified with the methods shown in the Letters Patent U.S.A. Pat. No. 4,468,623 and in the European early publication EP-A3-13 0 287 320. The essence of the methods cited above lies in application of a measuring downhole tool comprising pads made of electrically insulating material. and a system of metallic electrodes arranged within the pad. During the measurements, the downhole tool is lowered and pressed to the wall of the borehole in different places. The electrodes generate a micro-electric field in their narrow environment. The micro-electric field penetrates the rocks adjacent to the insulating pad and is distorted by them. The parameters of the microelectric field are measured and the data obtained thereby analyzed. The measured parameters are the electric current intensities and voltages and by processing them it is possible to determine whether fractures are present in the region investigated.

In the references cited, a method applicable to the measurements of sharp local inhomogeneities on the wall of a borehold in layers pierced by this borehole is proposed, wherein an electric field is generated by microelectrodes in a conductive way on the wall of the borehole. The microelectrodes are insulated from the drilling mud filling the borehole by insulating pads excluding direct electric contact to the conductive liquid present in the borehole. In the next step, the currents are determined at two or more localizations in the borehole by carrying out local measurements. The current intensities are coupled in a parallel way with one another in a current field generated perpendicularly to the wall of the borehole in the rock insulated from the drilling mud. The local inhomogeneities are determined on the basis of comparing the parallel current intensities: for each measurement the dimensionless ratio of the current intensities is computed and the maximum values of the dimensionless ratios are applied for displaying inhomogeneities on a major surface area divided into smaller regions.

The mentioned methods and apparatuses ensure highly effective measurements of the inhomogeneities on the wall of a borehole. However, they are characterized by two main disadvantages of generic character:

i. The investigations achieve penetration of the rocks only to a shallow depth, i.e., in the practice it is impossible to differentiate the open fractures forming parts of a communicating fracture network showing remarkable hydraulic flow capabilities from the closed fractures produced mainly by the boring operation due to altering the stress distribution system in the interior of the rock. This impossibility follows from the fact that the networks of both types of fracture are deeper than the radial investigation depth of the microelectric field in the rock formation.

ii. The background art is based on the obviously inaccurate assumption that the fractures constitute generally straight line formations in the wall of the borehole. Hence, during the data processing the fractures are supposed to traverse the rock along straight lines. This assumption results in erroneous determinations of the trend directions of the fractures - the fractures traversing the rocks along broken and curved lines cannot exactly be determined.

SUMMARY OF THE INVENTION

The present invention is directed to elaborating a microelectrical logging method and apparatus for carrying out measurements to differentiate open fractures from closed fractures and to determine the network of the open fractures in hard rocks pierced by a borehole. Thus, the invention provides a method and an apparatus for obtaining highly reliable data constituting basis of determination the fracture structure in a wide environment of the borehole.

The present invention is based on a combination of two recognitions, namely with the known resistivity logging methods applying focused current fields, especially with pad-type microelectrode systems forced to the wall of borehole, the intensity of the central main current supplied inside the bucking or opposing current field increases when a fracture traverses the main current field which increase is appreciably characteristic if the fracture is filled with hydraulically mobile conductive fluid, and, on the other hand, there occurs also a simultaneous potential distortion in the field of the main current.

On the basis of said combination of two recognitions, the main features of the present invention can be summarized as follows.

According to the first feature of the present invention a controlled and focused microelectric field is generated on the outside of an inner protected surface of an insulating pad pressed to the wall of the borehole. In this protected space a circular form, generally ring shaped measuring electrode M, and a concentrical point-like central measuring electrode K are placed. To the protected surface, remarkable current transport can be observed from the microelectric field only in the case, when on the wall of the borehole there is a fracture traversing the area investigated by the pad, the fracture being present oppositely to the protected surface. The measuring system generates in this case a signal corresponding to a dimensionless parameter $U_{MK}/U_K$ representing a potential ratio generated by current transport values. The first of these, $U_{MK}$ is proportional to the current transport flowing from the ring shaped measuring electrode M to a central measuring point K, both electrode and measuring point lying within the protected surface. The second member of the ratio, $U_K$ is proportional to the current transport flowing in direction perpendicular to the surface of the pad, the second member being measured in the central measuring point K with respect to a far reference electrode N. The dimensionless ratio $U_{MK}/U_K$ has a very low, nearly zero value if the wall of the borehole is free of fractures and shows remarkably higher value if a fracture traverses the wall of the borehole oppositely to the protected surface of the insulating pad.

The dimensionless ratio $U_{MK}/U_K$ is an indicator of the presence of a fracture, however it in itself doesn't make a reliable basis for differentiating fractures according their hydraulic conductivity, because of shallow depth of the investigation. Hence, this ratio is only a piece of information on the presence of the fracture.

The recognition is that a further dimensionless ratio $I_1/I_2$ of two current fluxes is characteristic for the kind of the fracture, i.e., this ratio can be the basis of differentiating the open fractures from the closed ones.

The current flux $I_1$ is the main measuring current of the microelectric field and it is fed into the space filled with the rock from a ring shaped metallic electrode $A_1$ arranged around the ring shaped measuring electrode M and the central measuring point K, adjacently to the outer environment of the inner protected surface area of the insulating pad. The second current flux signed by $I_2$ is a bucking current fed into the rock environment by another ring shaped electrode $A_2$ having radius greater than that of electrode $A_1$. The first current flux $I_1$ is sharply focused by arranging two further ring shaped electrodes $S_1$ and $S_2$ between the aforementioned ring shaped metallic electrodes $A_1$ and $A_2$. The magnitude of the current flux $I_2$ is regulated in an automatic system with respect to the current intensity $I_1$ in order to ensure by the current transport between the regulating ring shaped electrodes $S_1$ nd $S_2$ a potential difference $\Delta U$ with value near or practically equal to zero.

This method of the automatic regulation results in high value of the inner current flux $I_1$ with respect to the second current flux $I_2$ when in the hard rock formation an open, hydraulically conductive fracture is present at the inner protected surface of the downhole investigation pad, the fracture facing the ring shaped current electrodes $A_1$ and $A_2$. Because of the focusing influence exerted by the second current flux assigned to the bucking current $I_2$, the first current flux $I_1$ assigned to the main current decreases if there is no open fracture in the measurement area. The lack of an open fracture with remarkable hydraulic conductivity means that there is no permeable and conducting medium through the hard rock formation wherein the electric current can flow, and the current escape through the film of the drilling mud between the measurement pad and the hard wall of the borehole is prevented by the focusing current transport $I_2$.

According to the conclusions made above, it can be stated that the dimensionless ratio $I_1/I_2$ has a very low, nearly zero value in lack of the open fractures and it shows a remarkable increase in value if the arrangement faces an open fracture, due to the increased permeability and conductivity of the medium filling out the inner space of the open fractures. Thus, the dimensionless ratio $U_{MK}/U_K$ indicates whether a closed or open fracture is present in the interior of the field limited by the ring shaped electrodes, and the dimensionless ratio $I_1/I_2$ gives the basis of differentiating the open fractures from the closed ones, giving relatively high values in the case of open fractures, i.e., fractures forming part of a communicating vessel system with remarkable hydraulic conductivity.

The invention further introduces the dimensionless normalized product $$H = \left(\frac{U_{MK}}{U_K}\right)\left(A\frac{I_1}{I_2}\right)^B$$

computed from the mentioned dimensionless indicating ratios on the basis of known mathematical constants A and B. This product is especially capable of differentiating the open fractures from the closed ones because it attenuates the indication whenever the fracture is a closed formation and amplifies, increases the indication when answering to the open fractures. The increase itself depends on the magnitude of the hydraulic conductivity of the fracture identified by the pad.

The mathematical constants A and B are determined by means of known optimizing regression analysis for enhancing the increase of $I_1/I_2$ and $U_{MK}/U_K$ caused by the open fractures with a simultaneous attenuation of the effects caused by other geophysical-geological variations of the investigated hard rocks wherein the values of constants A and B are dependent on the geophysical-geological conditions of the rocks.

The second feature of the present invention is to provide a method for determining the network of the open fractures showing a given level of the hydraulic conductivity and being identified according to the first feature depicted above. The method as proposed is based on further important steps following the determination of the mentioned dimensionless ratios. According to the method, the inner protected surface of the insulating pad is limited by a measuring ring M divided into more segments. Generally, the number of the segments lies in the range of from 4 to 24. For practical purposes, the number of 12 seems to be fully acceptable, it can ensure the required accuracy. For each segment, a further dimensionless ratio $U_{MKi}/U_K$ is determined, wherein $U_{MK},i$ means the potential difference measured between the i-th segment of the electrode M and the electrode K generated by the current transport between the i-th segment of the measuring ring M and the electrode K. $U_K$ refers to the absolute potential value of the central measuring point K related to a far reference electrode. This dimensionless ratio can be regarded as an elementary fracture indication having value obviously depending on the relative direction of the fracture line in the moment of the measurement with respect to the straight line connecting the i-th measuring segment of the ring M with the central measuring point K. According to the method presented here, the elementary fracture indication is determined for each segment of the segmented measuring ring (the number of the segments is n), i.e., the elementary fracture indications $U_{MK,i}/U_K, U_{MK,2}/U_K, \ldots U_{MK,n}/U_K$ form the basis of determination of the geometric orientation of the fracture facing the insulating pad.

It is clear that in this method there is no general preconception that the open fractures traverse the inner protected surface of the pad along a straight line. The geometric arrangement of the fracture can be determined according to the reality: a good approximation of the broken or curved line is obtained.

In order to determine the geometric arrangement of the fracture as it stands, the elementary fracture indications $U_{MK,i}/U_K$ are tested and thereamong the two with local maxima (e.g., $U_{MK,j}/U_K$ and $U_{MK,m}/U_K$, belonging to the j-th and m-th segments) are selected. The straight lines connecting the j-th and m-th segments with the central measuring point K generally lie not on a common straight line, i.e., not along the same diagonal crossing the central measuring point K. A straight line fracture can also be determined on this basis.

According to this second object of the invention, the measurement of the real geometric orientation of the fractures in their network is ensured by carrying out a series of determinations.

The third main feature of the invention is to apply the principle of plurality, i.e., to carry out measurements in more points around the cross sections of the borehole simultaneously. This means, the orientation of the open fractures with remarkable hydraulic conductivity is determined in more points in the same time. The number of the measuring points vary between 2 and 8, generally 4 points are applied. Obviously, the number of the measuring points can be as high as necessary. On the basis of the simultaneous measurements carried out in separate points of the cross section of the borehole, a continuous picture of the fractures in the hard rock formation can be obtained.

In given circumstances, the measurements carried out simultaneously can interfere one with another. This is avoided by the method of the invention by selecting different frequency values for ensuring the independency of the separate measurements. This means, different frequency values signed by $f_1$, $f_2$, $f_3$, $f_4$ (if 4 pads are applied) are selected for generating the microelectric fields in the pads. Generally, the frequency values should not exceed a limit of 1 kHz.

The fourth feature of the present invention is to make use of electrodes divided into more segments instead of the ring shaped main current electrode $A_1$ forming a continuous ring. The potential of the microelectric field generated by the segments should be constant. The equipotential system of the segments renders it possible to avoid current flow from the electrode segments $A^1$ to the inner part covered by a surface limited by the segments of electrode $A_1$ if the wall of the borehole is free from fractures. The equal potential of the segments is ensured by connecting them in series through very low value ohmic resistors. The resistor connected in series with the given segment can be applied also for the measurement of that part of the main current which is fed into the rocks over the given segment. The partial current fed by the given i-th segment signed by $I_{1,i}/I_2$ is also a fracture indication giving a piece of selective information of place and direction of the fracture, similarly to the partial fracture indications $U_{MK,i}/U_K$ defined earlier in the case of the measuring electrode M divided into more segments. By forming a segmented ring shaped electrode $A_1$, it is possible to enhance the directional sensitivity of the measurements and a further very advantageous feature is received: the mud layer or mudcake between the pad of the downhole investigation tool and the wall of the borehole can be detected and its thickness can be determined.

This is carried out in the following way;

The first step is to determine for the segmented ring shaped main current electrode $A_1$ the mean (average) value $\overline{I_{1,i}}$ of the partial currents defined above:

$$I_{i,i} = \frac{1}{n} \sum_{i=1}^{n} I_{1,i}$$

The mean value $\overline{I_{1,i}}$ is subtracted from the partial currents $I_{1,i}$ and the difference thus obtained is divided by the bucking current flux $I_1$. The dimensionless normalized differences received for each of the segments, i.e., the dimensionless ratios $$\frac{I_{i,i} - I_{1,i}}{I_2}$$

are then divided into two groups: the first of the two groups belongs to the highest values of the said ratios and at most to the first four of them, the values exceeding a predetermined threshold E; the relatively high values given evidence of fractures traversing the lines of corresponding segments. Hence, the serial numbers (e.g., j, m, p, v) of these segments ensure the possibility of determining the features of the fractures with respect to their directions and geometric patterns. If all mentioned ratios have values below the mentioned threshold E, it means that there is no fracture in the region actually investigated by the pad, but there is a mud layer between the pad and the fracture-free wall of the borehole. In this case, the mentioned dimensionless normalized differences are to be proved further whether they fall below another predetermined threshold w which is smaller than E; if they do, it means the mud layer is obviously a mudcake lying on the wall of the borehole, and if not, the mud layer consists of real mud filling the space between the pad and the wall of the borehole, the last having a not smooth but rugose surface. Hence, according to the invention, it is possible to differentiate the mudcake from the rugosity effect of the wall of the borehole, further to determine the thickness either for the mudcake or for the rugosity (both can be signed by $t_m$), because the higher the value of the dimensionless ratio $I_{1,i}/I_2$ the thicker the mud layer (or the rugosity). The thickness $t_m$ can be determined on the basis of a functional dependency of the thickness $t_m$ on the magnitude of the dimensionless ratio $I_{1,i}/I_2$. If the ring shaped main current electrode $A_1$ is divided into segments, it is possible to obtain a fracture indication value $H_e$ of very rich informative content which value differs from the indication value H defined above because of applying only the sum of the partial currents $I_{1,i}$ exceeding the first mentioned threshold E, the sum replacing the full main current flux $I_1$:

$$H_e = A \left( \frac{I_{1,j} + I_{1,m} + I_{1,p} + I_{1,v}}{I_2} \right)^B \left( \frac{U_{MK}}{U_K} \right)$$

This indicator is equal to zero whenever there isn't any partial current exceeding in value the mentioned threshold E. The zero level of the indicator $H_e$ defined above is an evidence for lack of the fractures. The level of the indicator $H_e$ differing from zero shows the magnitude of the hydraulic conductivity of the fracture; the accuracy of this determination of the hydraulic conductivity is higher than that of the determination based on the previously defined indicator H.

The mathematical constants A and B and the thresholds E and w have values depending on the given circumstances, on the geophysical and geologic conditions of the measurements.

The fifth disclosure of the present invention is to provide a simple but improved electrode arrangement for feeding the bucking current. The feeding is achieved by ring shaped electrodes $A_2$ and $A_3$ surrounding the ring shaped main current electrode $A_1$ and replacing the monitor electrodes $S_1$ and $S_2$ for detecting voltages. The main current electrode $A_1$ can be divided into segments if required. In this embodiment, the potential measuring electrodes M and K are the same as before. The current feeding electrodes $A_3$, $A_2$ and $A_1$ are connected through respective resistors of very low ohmic values to the output of a generator for producing the main current $I_1$ (or the partial currents $I_{1,i}$ of the segments). Hence, the potential of the ring shaped electrodes $A_1$, $A_2$ and $A_3$ is always the same. Between the rings of the electrodes $A_2$ and $A_1$, further $A_3$ and $A_2$ there are respective potential troughs (regions characterized by low potential values) in the space between the surface of the insulating pad of the downhole tool and the wall of the borehole. The mentioned two potential troughs prevent current leakage to the conductive drilling mud column from the main current flux $I_1$ in absence of fractures.

These two potential troughs are capable of creating potential conditions which are similar as in the case of applying the electrodes $S_1$ and $S_2$ for detecting monitor potential, when the ring shaped electrode $A_2$ is applied for feeding in a controlled bucking current $I_2$ in order to ensure zero potential difference between the monitor electrodes $S_1$ and $Z_2$.

The sixth feature of the present invention is to apply an arrangement for better selecting the peak value of the dimensionless fracture indicator $U_{MK}/U_K$. According to the invention, this can be achieved by replacing the small point shaped electrode forming the central measuring point K by a ring shaped electrode of relatively larger diameter. In this case, the peak value of the dimensionless fracture indicator $U_{MK}/U_K$ can be longer observed: the peak measurement level exists as long as the ring shaped electrode K faces the fracture during the movement of the downhole tool and this time is enlarged by the larger diameter of the ring shaped measuring electrode M. Due to the longer time it is possible to carry out a high accuracy measurement of the peak value assigned to the dimensionless ratio $U_{MK}/U_K$ whereby the accuracy of determining the hydraulic conductivity increases, too. The increase follows from the improved determination of the fracture indicators H and $H_e$.

The seventh feature of the present invention is to ensure further enrichment of the informative content of the data obtained by the measurement. According to a modified embodiment of the proposed method, in the fracture indicators H and $H_e$ the exponent B is selected to have an optimum value reflecting the given hydraulic conditions of the open fractures (this exponent is signed further by Y) and the coefficient A is given the value 1.0. Further, the fracture indicator $U_{MK}/U_K$ is raised to an optimum X-th power. The optimum exponents Y and X can be determined by the means of known optimizing regression analysis, as shown already within the description of the first feature of the present invention. In this way, modified hydraulic fracture indicators M' and $M'_e$ can be obtained which are defined as follows:

$$M' = \left(\frac{I_1}{I_2}\right)^Y \left(\frac{U_{MK}}{U_K}\right)^X,$$

and $$M'_e = \left(\frac{I_{1,j} + I_{1,m} + I_{1,p} + I_{1,v}}{I_2}\right)^Y \left(\frac{U_{MK}}{U_K}\right)^X$$

The eighth object of the present invention to apply once more the principle of the plurality, i.e., to carry out simultaneous measurements along the circumference of a cross section of the borehole. The data obtained from the simultaneous measurements carried out in 2 to 8, preferably 4 points renders it possible to determine a continuous picture of the features of the borehole and its environment. Obviously, the picture prepared continuously has a very rich informative content with respect to that of based on single measurements.

Hence, the present invention as depicted above in accordance with different disclosures offers a solution for differentiating the open, hydraulically conductive (i.e., forming parts of a system of communicating vessels) fractures from the closed fractures showing low or negligible hydraulic conductivity.

One further advantage of the invention is that the directions of the fractures can be determined, too. This is ensured by altering the place of measuring the potential values and/or introducing currents, by segmented embodiments of the electrodes.

A further advantage is that the combination gives adequate data for differentiating the rugose (uneven) wall of the borehole from the hydraulic connection system really present in the fracturized hard rock formation.

The method and the apparatus according to the invention give therefore a reliable basis for determining whether the fractures measured are natural formations or have resulted from the process of drilling the borehole.

BRIEF DESCRIPTION OF THE DRAWINGS

The invention will be further explained in more detail with reference to preferred embodiments and realizations shown in the accompanying drawings wherein.

Figure 1:
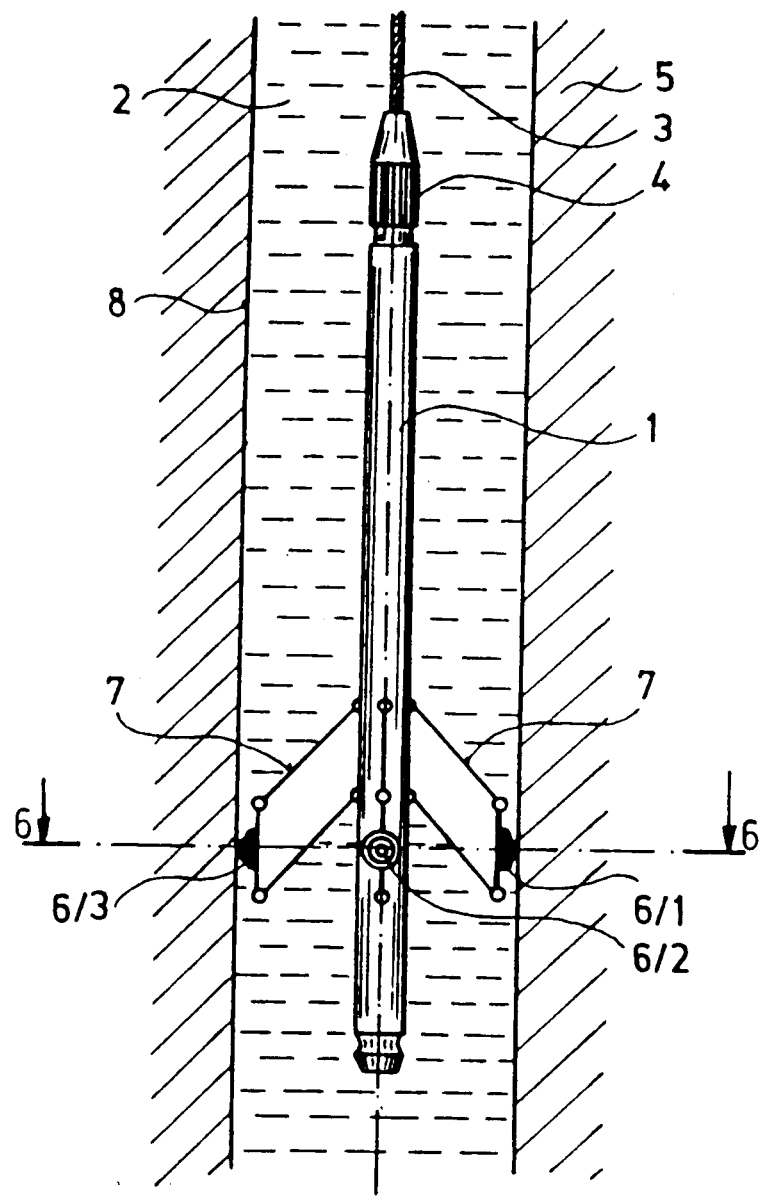
FIG. 1 is a lateral view of the downhole tool lowered into the borehole with pads pressed to the wall of the borehole, with cross section of the hard rock formation.

As it is shown in FIG. 1, a downhole measuring tool 1 for investigating fractures is suspended on a well logging cable 3 which is connected to a head unit 4 of the downhole measuring tool 1. The suspension is realized in a borehole filled with drilling mud 2 and lowered in a hard rock formation 5 to be investigated. The well logging cable 3 connects the downhole measuring tool 1 with a surface operating unit (not shown in the drawing), comprising means for data processing. The downhole measuring tool is built up with appropriate arms 7 bearing respective measuring pads 6/1, 6/2, 6/3 (designated generally by 6 in FIGS. 3 and 5) made of insulating material and equipped with an electrode system for carrying out the measurements and forwarding the necessary currents. The number of the measuring pads 6 is not limited to three as shown in FIG. 1, it can be, if required, higher or lower, depending on the conditions of the measurements. The pads 6/1, 6/2, and 6/3 are pressed by the arms 7 to a wall region 8 of the borehole.

The surface operating unit includes most of the electronic elements listed up in the following. Of course, only the equipment arranged on the pads 6 constitute those parts of the apparatus as proposed which obviously must be arranged in the downhole measuring tool 1, the further elements and parts may be arranged either in the downhole measuring tool or in the surface operating unit.

Figure 2:
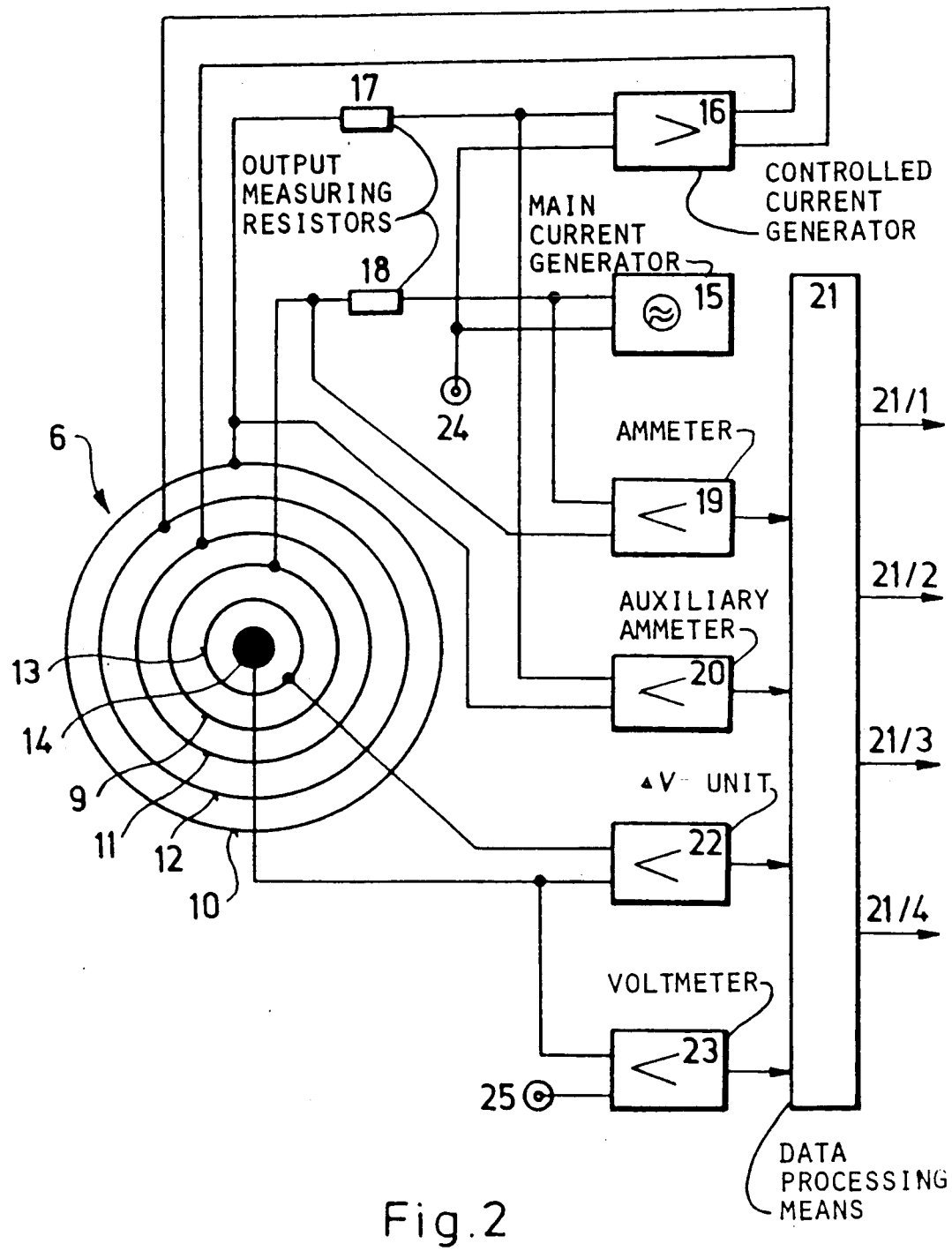
FIG. 2 shows a schematic diagram of a first embodiment of the apparatus proposed by the invention with a continuous measuring ring M.

FIG. 2 represents a schematic circuit diagram of a first embodiment of the apparatus proposed by the invention wherein an electrode system consisting of ring shaped elements is arranged on a measuring pad 6. The downhole measuring tool 1 (FIG. 1) is generally equipped with a higher number of pads built up with circuit diagram according to FIG. 2.

The measuring pad 6 bears a central electrode 14 for voltage measurements. The central electrode 14 is constituted by a spot-like metallic element, however, it may be made also in form a ring having small diameter. The measuring pad 6 is built up with a carrier body 36 (FIG. 3 and 5) made of electrically insulating material. The mentioned system of the electrodes is arranged on one side of the carrier body 36 and oppositely to this side the carrier body 36 with the arm 7, whereby a direct contact between the electrodes and the wall region 8 is realized. The arm 7 presses the carrier body 36 to the wall region 8 and thereby the electric contact between the drilling mud 2 and the system of electrodes is excluded as shown in FIGS. 3A and 5A, i.e., from the side of the arm 7 (not shown in FIGS. 3A and 5A) the drilling mud 2 cannot come into contact with the system of electrodes contacted with the wall region 8 of the borehole.

The central electrode 14 is surrounded by an outer 21 measuring electrode 13, followed—from inside of the measuring pad 6 to it circumference—by a first feeding electrode 9, a first and a second detecting electrodes 11 and 12 and a second feeding electrode 10. The first and second detecting electrodes 11 and 12 are applied for providing observation of the potential conditions as it will be described later.

The first feeding electrode 9 is connected over a first output measuring resistor 18 to a first output of a main current generator 15 having a further output connected to a far return feeding electrode 24. The first output measuring resistor 18 is inserted also between two respective inputs of an ammeter 19 having an output coupled with an input of a first arithmetic data processing means 21 equipped with output means 21/1, 21/2, 21/3, 21/4 for forwarding respective signals according to the measured parameters.

The second feeding electrode 10 is connected over a second output measuring resistor 17 to a first output of a controlled current generator 16 coupled through its second output to the far return feeding electrode 24. The controlled current generator 16 for generating bucking current is connected through its inputs with the first and second detecting electrodes 11 and 12. The first output measuring resistor 18 is an active when measuring the main current supplied to the first feeding electrode 9 and the second output measuring resistor 17 checks the bucking current fed from the controlled current generator 16 to the second feeding electrode under influence of the input state determined by the first and second detecting electrodes 11 and 12.

The second output measuring resistor 17 is connected between two inputs of an auxiliary ammeter for measuring the bulking current produced by the controlled current generator 16, and the output of the auxiliary ammeter 20 is coupled with an input of the first arithmetic data processing means 21.

A unit 22 for measuring voltage difference is connected through its inputs within the outer measuring electrode 13 and the central electrode 14, which is in the case of the circuit diagram shown in FIG. 2 a point-like metallic element. One input of the unit 22 is connected to a first input of a voltmeter 23 connected by its second input to a far reference electrode 25 supplying reference voltage for carrying out measurements of absolute value of the voltage. The output of the voltmeter 23 and the unit 22 as well are connected to respective inputs of the first arithmetic data processing means 21.

The outputs 21/1, 21/2, 21/3, 21/4 of the first arithmetic data processing means 21 forward respective measurement data to further data processing means.

Figure 3:
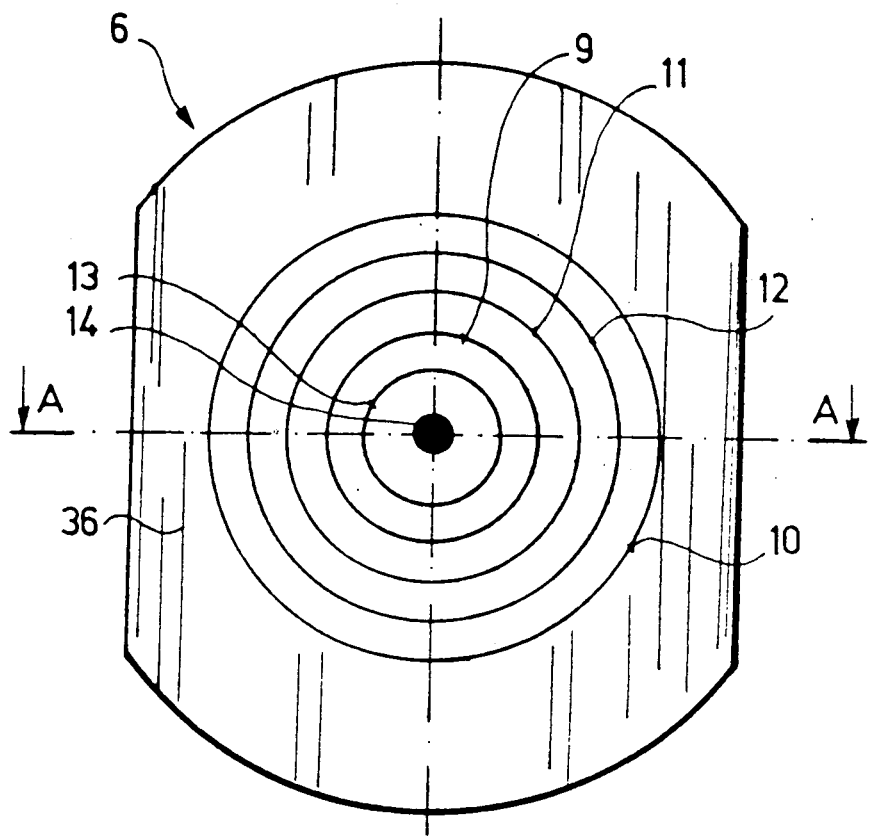
FIG. 3 is a front view of the measuring pad of the downhole tool having block diagram according to the FIG. 2.
Figure 3A:
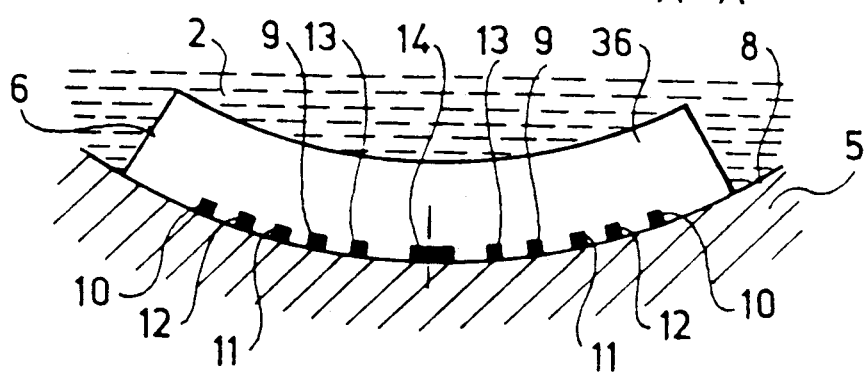
FIG. 3A is a cross section taken along a line 3A—3A of the measuring pad of the FIG. 3.

The carrier element 36 of the pad 6 with circuit diagram according to FIG. 2 is shown in front view (from the side pressed to the wall region 9 of the borehole) in FIG. 3 And in cross-section 3A—3A in FIG. 3A. The curved surface of the measuring pad 6 is pressed against the investigated wall region 8 in the hard rock formation 8 in a way that there is no electric contact between the electrode system of the measuring pad 6 and the drilling mud 2. The position of the carrier body 36 of the measuring pad 6 is secured by the arm of the downhole measuring tool 1 (not shown in these figures). The measuring pad 6 bears the point-like central electrode 14 and the surrounding further ring shaped electrodes, i.e., the first and second detecting electrodes 11 and 12 and the second feeding electrode 10. The elements for fitting the measuring pad 6 are not shown in FIGS. 3 and 3A.

Figure 4:
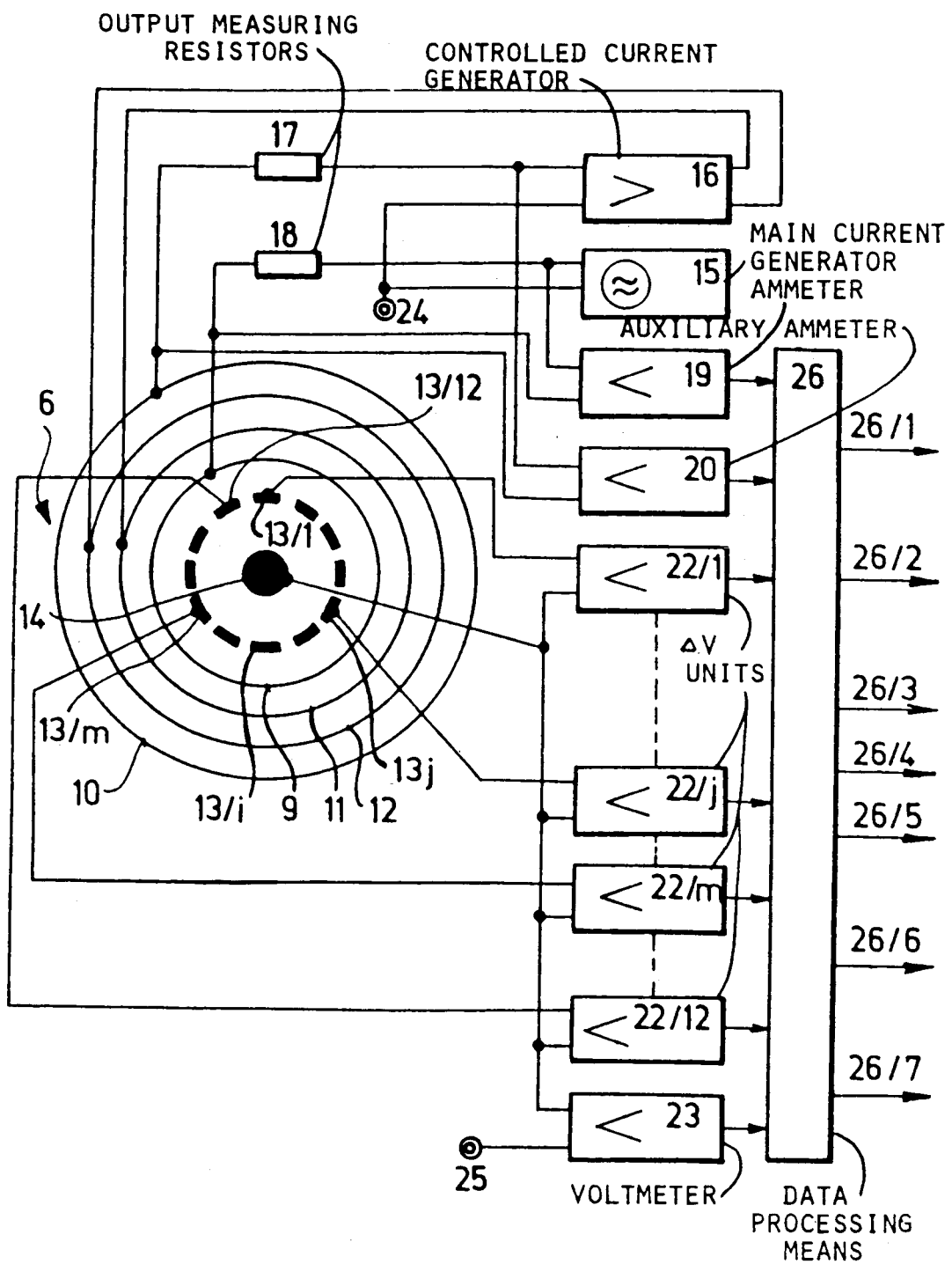
FIG. 4 is a schematic circuit diagram of a second embodiment of the proposed apparatus wherein the measuring ring M divided into n=12 segments forming elementary measuring points is applied.

A further advantageous embodiment of the apparatus proposed by the invention is represented by a circuit diagram shown in FIG. 4. This embodiment is capable of carrying out measurements of the system of open fractures terminating at the investigated wall region 8. According to the circuit diagram shown in FIG. 4, the ring shaped first feeding electrode 9 is connected by the first output measuring resistor 18 to the first output of the main current generator 15, the second output of which is coupled with the far return feeding electrode 24. The ring shaped first and second detecting electrodes 11 and 12 are coupled with respective inputs of the controlled current generator 16 supplying bucking current to the second feeding electrode 10 through the second output measuring resistor 17 under influence of the signals received through respective inputs from the first and second detecting electrodes 11 and 12. The second output of the controlled current generator 16 is coupled also with the far return feeding electrode 24. The first output measuring resistor 18 is connected with the ammeter 19 for measuring the main current supplied by the main current generator 15 and the second output measuring resistor 17 is arranged at the input of the auxiliary ammeter 20 intended to determine the bucking current.

The difference of this embodiment to that shown in FIG. 2 is that the outer measuring electrode 13 is divided into more segments, some of them signed by 13/1, 13/j, 13/m and 13/12. The number of the segments of the outer measuring electrode 13 is not specific, it depends on the given circumstances. An advantageous number is twelve as depicted in FIG. 4. The segments of the outer measuring electrode 13 constitute a segmented ring arranged concentrically to the central electrode 14. Each of the segments is connected to respective units for measuring voltage difference, whereunder only four signed by 22/1, 22/j, 22/m, 22/12 are represented in FIG. 4. A common input of the units for measuring voltage difference is connected with the central electrode 14, and thereby the central electrode 14 is linked with the voltmeter 23 having an input driven from the far reference electrode 25 creating the possibility of determining the absolute value of the voltage. The FIG. 4 shows only the segments signed by 13/1, 13/j, 13/m, 13/12 connected to the inputs of the units 22/1, 22/j, 22/m, 22/12 for measuring voltage difference, however, obviously all segments of the outer measuring electrode 13 are assigned to respective units for measuring voltage difference.

The outputs of the ammeter 19 and auxiliary ammeter 20, the units 22/1, 22/j, 22/m, 22/12 and the voltmeter 23 are coupled with respective inputs of a second arithmetic data processing unit 26 having outputs 26/1, 26/2, 26/3, 26/4, 26/5, 26/6, 26/7, for forwarding signals according to the measured data.

Figure 5:
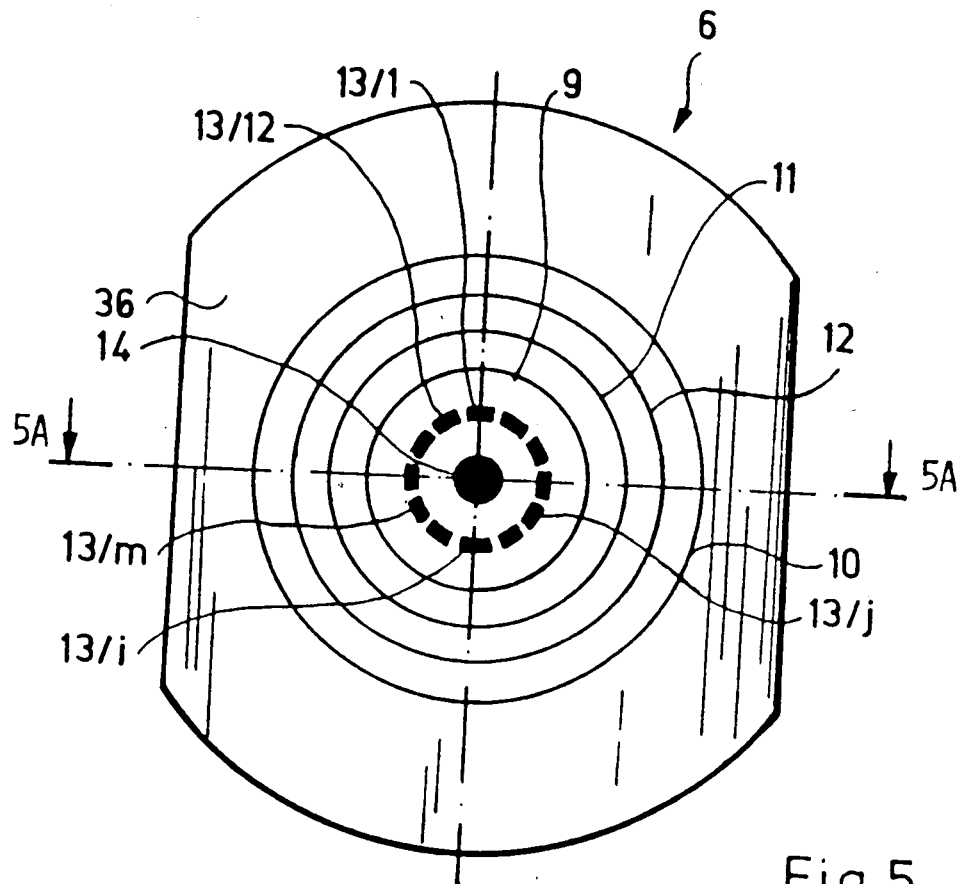
FIG. 5 shows a front view of a measuring pad of the downhole tool with electrodes arranged according to the FIG. 4.
Figure 5A:
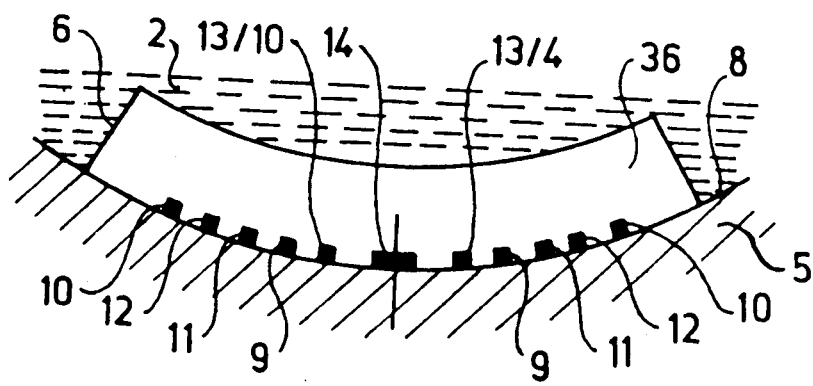
FIG. 5A is a cross section taken along a line 5A—5A of the measuring pad shown in the FIG. 5.

The measuring pad 6 of the embodiment represented by the circuit diagram of FIG. 4 is shown in front view in FIG. 5 and in cross-section 5A—5A in FIG. 5A. In this case, also the system of the electrodes is arranged on the carrier body 36, on its side facing the wall region 8 to be investigated in the borehole. The inner curved surface of the carrier body 36 connected with the arm 7 (not shown in FIGS. 5 and 5A) faces the drilling mud 2. The outer curved surface is pressed to the wall region 8 in a way excluding the direct electric contact between the drilling mud 2 and the electrode system. The measuring pad 6 is equipped with the point-like central electrode 14 and the further surrounding ring shaped electrodes, i.e., the outer measuring electrode 13 divided into segments 13/1, 13/i, 13/j, 13/m and 13/12, the first feeding electrode 9, the first and second detecting electrodes 11 and 12 and the second feeding electrode 10. The elements for fitting and pressing the measuring pad 6 are not shown in these figures, too.

In the embodiment shown in FIG. 5, the outer measuring electrode 13 is divided into twelve segments. The cross-section is taken along a line 5A—5A crossing the fourth and tenth of the segments, signed by 13/4 and 13/10. The arrangement of the further electrodes is the same as shown in the FIG. 2.

Figure 6:
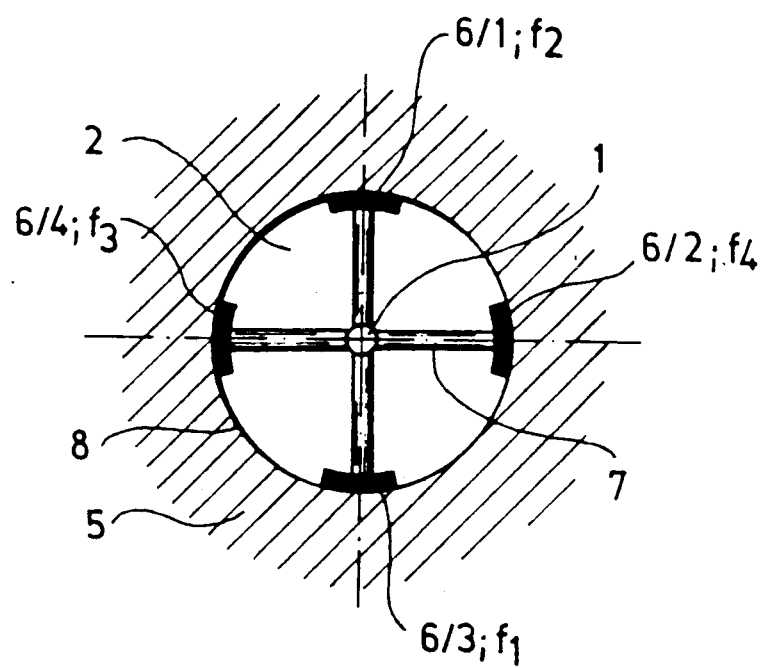
FIG. 6 represents a horizontal cross section 6—6 of a four pad embodiment of the downhole investigation tool shown in FIG. 1, the four pads arranged in a system for carrying out simultaneous measurements.

A downhole measuring tool 1 in an embodiment with four measuring pads 6 is shown in cross section in FIG. 6, in a cross section taken along a line 6—6 determined according to FIG. 1. The four measuring pads 6/1, 6/2, 6/3, 6/4 are pressed by respective arms 7 to the investigated wall region 8 of the borehole and they bear the electrode systems applied to the measurements (not shown in this Figure). The arms 7 bearing the measuring pads 6/1, 6/2, 6/3 and 6/4 are immersed in the drilling mud 2 filling out the interior of the borehole. The mechanical construction of the arms 7 (not shown in detail either here or in connection with other Figures) ensures that the pads 6/1, 6/2, 6/3, 6/4 are pressed to the wall region 8 in the hard rock formation 5 by drilling the borehole in presence of the drilling mud 2. The pressing mechanism guarantees that during the measurements there is no direct electric contact between the drilling mud 2 and the electrode system facing the wall region 8 on the measuring pads 6/1, 6/2, 6/3, and 6/4. The specific feature of the embodiment shown in FIG. 6 is that the electrode systems of the measuring pads 6/1, 6/2, 6/3 and 6/4 are fed with currents of different frequency values respectively $f_1$, $f_2$, $f_3$ and $f_4$ in order to avoid interference between the measurements carried out simultaneously by the measuring pads 6/1, 6/2, 6/3, 6/4. Obviously, the number of the measuring pads is not limited to four as shown in FIG. 6. Advantageously the frequency values are selected in the range to 1 kHz. It should be noted that the mechanical construction of the arms 7 is per se well known and doesn't require more explanation.

Figure 7:
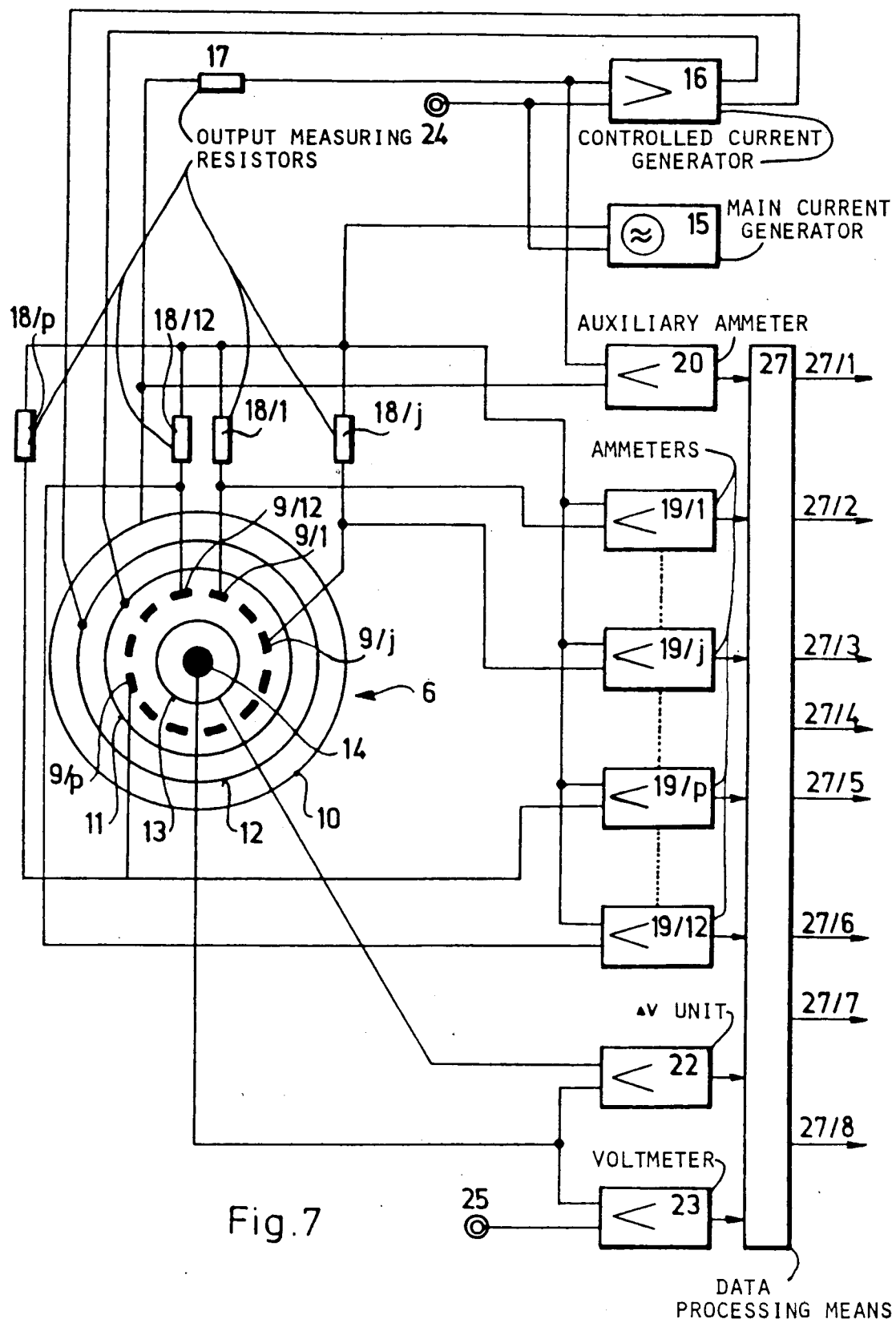
FIG. 7 is a schematic circuit diagram of a third embodiment of the apparatus proposed by the invention, wherein the apparatus is equipped with the measuring electrode $A_1$ divided into n=12 segments for feeding in partial current fluxes.

A further very advantageous embodiment of the apparatus proposed by the present invention is shown in the form of a circuit diagram in FIG. 7. This circuit diagram is, in most of the details, similar to those represented in FIGS. 2 and 4. The measuring pad 6 belonging to a downhole measuring tool 1 (FIG. 1) is intended to determine the geometric orientation of the fractures in a network system reaching the wall region 8 of the borehole and to detect whether a mudcake or a mud layer is present on the wall of the borehole between the measuring pad 6 and the wall of the borehole. In this arrangement the first feeding electrode for supplying the main current signed in the previous FIGS. by 9 is divided into more, e.g., twelve feeding segments, four of them signed by 9/1, 9/j, 9/p and 9/12. The segments of the first feeding electrode 9 are connected over respective first output current measuring resistors—four of them are shown signed by 18/1, 18/j, 18/p, 18/12—with an output of the main current generator 15. The circuit arrangement is generally the same as shown in FIG. 2.

The other output of the main current generator 15 is connected with the far return feeding electrode 24, the ring shaped first and second monitoring electrodes 11 and 12 for measurement of potential values are connected with respective inputs of the controlled current generator 16 producing the bucking current, coupled through its outputs over the second output measuring resistor 17 to the second feeding electrode 10 and directly to the far return feeding electrode 24. The first output current measuring resistors signed by 18/1, 18/j, 18/p, 18/12 are connected over their common points with the respective feeding segments, i.e., 9/1, 9/j, 9/p and 9/12 to respective inputs of ammeters, wherein FIG. 7 shows only four ammeters signed by 19/1, 19/j, 19/p, 19/12. The poles of the second output measuring resistor 17 are connected to inputs of the auxiliary ammeter 20 for determining the value of the bucking current. The other poles of the firt output current measuring resistors 18/1, 18/j, 18/p, 18/12 etc. are united by a common conductor led to the respective other inputs of the ammeters 19/1, 19/j, 19/p, 19/12, etc. The ring shaped outer measuring electrode 13 and the generally point-like central electrode 14 are coupled with the inputs of the unit 22 for measuring voltage difference. The central electrode 14 is connected with the voltmeter 23 for measuring the absolute value of the voltage of the central electrode 14 against the far reference electrode 25. The outputs of the ammeters 19/1, 19/j, 19/p, 19/12, auxiliary ammeter 20, unit 22 for measuring voltage difference and voltmeter 23 are coupled with third arithmetic data processing means 27 having outputs 27/1, 27/2, 27/3, 27/4, 27/5, 27/6, 27/7, 27/8 for forwarding respective digital signals according to the measured parameter values.

Figure 8:
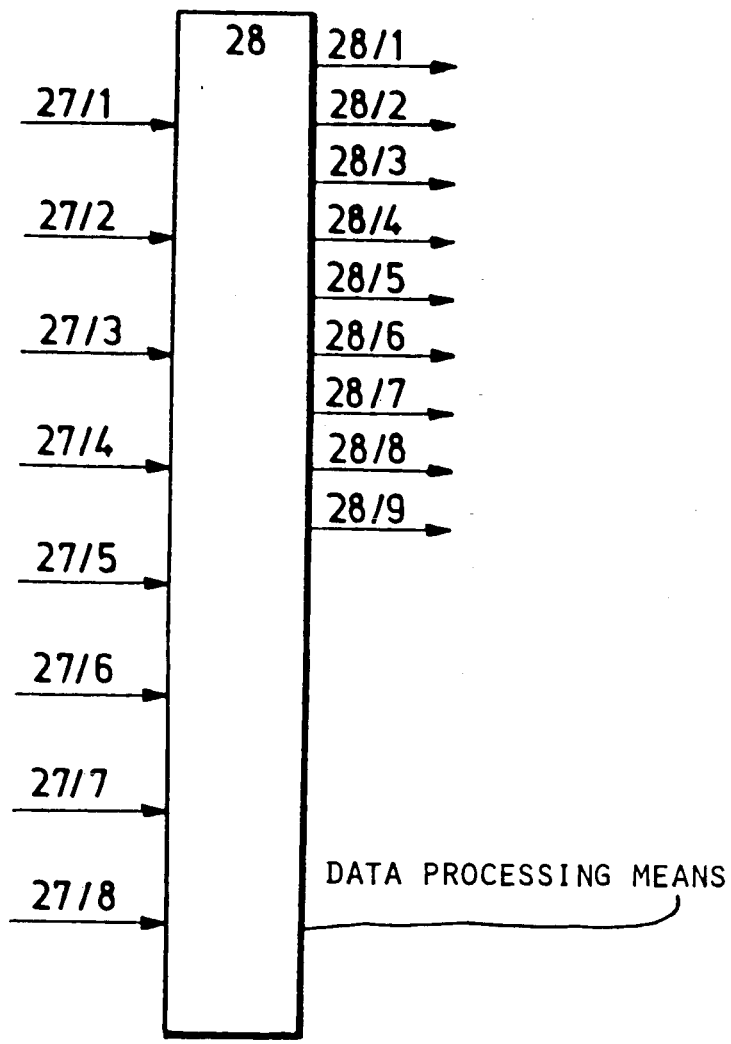
FIG. 8 is a schematic arrangement of the inputs and outputs of an enlarged arithmetic unit represented in the schematic circuit diagram of FIG. 7.

Complex arithmetic data processing means are represented in FIG. 8. These means form an expanded version of the third arithmetic data processing means 27 in FIG. 7. The inputs of the complex arithmetic data processing means 28 are generally the outputs 27/1, 27/2, 27/3, 27/4, 27/5, 27/6, 27/7, 27/8 of the third arithmetic data processing means 27, however their outputs designated by 28/1, 28/2, 28/3, 28/4, 28/5, 28/6, 28/7, 28/8 and 28/9 are independent of the third arithmetic data processing means 27 shown in FIG. 7.

Figure 9:
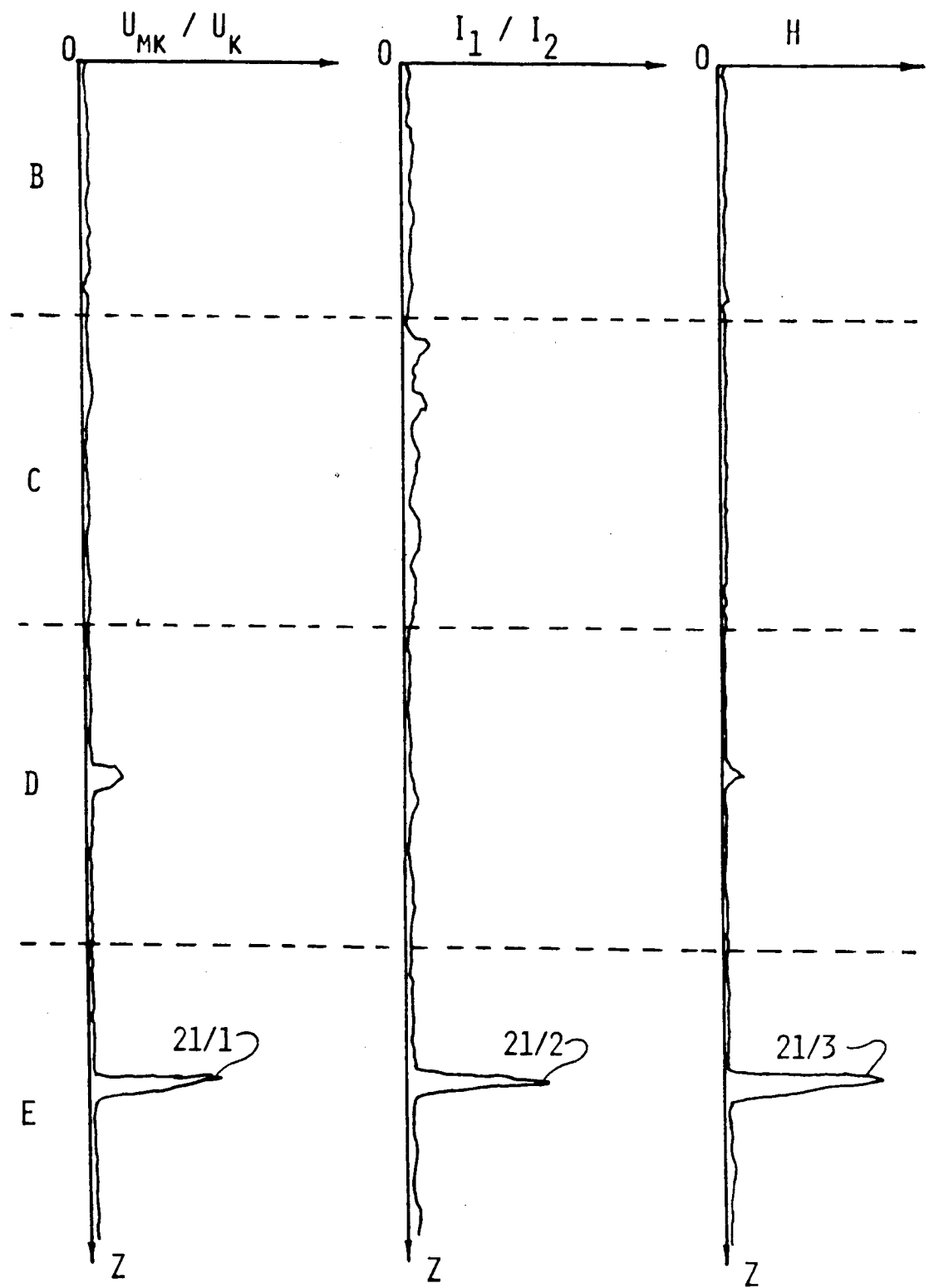
FIG. 9 is a detailed presentation of the outputs of apparatus shown in FIG. 2.

FIG. 9 represents a set of schematic fracture detector logs of $U_{MK}/U_K, I_1/I_2$ and H designated in FIG. 2 is the outputs of the processor unit 21. At the output 21/1, the dimensionless fracture detector (indicator) $U_{MK}/U_K$, at the output 21/2 the other dimensionless fracture detector value $I_1/I_2$, and at the output 21/3 the compounded fracture indicator H are each designated. The fracture detector logs are presented versus depth (Z) in the borehole, showing the readings as the tool is moved down in the borehole. Section B shows the fracture logs in a tight section of the hard rock without any fracture. Section C shows the same; however in a rugose interval. Section D shows the logs in the presence of a closed fracture, while Section E is the case of an open fracture.

The embodiments of the apparatus as proposed by the present invention shown in FIGS. 1 to 8 are operated in the following way, whereby the essence of the method of the invention can be also exemplified.

The downhole investigating tool 1 illustrated in FIG. 1 is equipped with an inner housing which is electrically isolated from the drilling mud 2. This inner housing may include some or nearly all circuit units of the measuring system(s) offered by the invention. The arms 7 of the downhole investigating tool 1 press the insulating carrier bodies 36 of the measuring pads 6 (signed also by 6/1, 6/2, 6/3 and 6/4) to the investigated wall region 8 of the borehole in the hard rock formation 5. The measuring pads 6 bear the metallic electrodes which are necessary for generating the microelectric fields of the determination, for monitoring and detecting the generated electric fields, and for regulating and measuring some parameters. The measuring pads 6 of the downhole investigating tool 1 are made of an insulating material, whereby the metallic electrodes are isolated from each other and the direct galvanic contact with the electrically conducting drilling mud is excluded. The metallic electrodes are contacted with the investigated wall region 8 of the hard rock formation 5 through a thin mud layer.

The measurements are carried out by the downhole measuring tool 1 suspended in the borehole and forwarded therein in a substantially continuous movement. The well logging cable 3 provides the downhole measuring tool 1 with an appropriate voltage supply unit and it forms the way of forwarding the signals representing the measured values or the processed measurement data.

During the process of logging, the feeding electrodes 9 and 10 generate, at each measuring pad 6, microelectric fields automatically and continuously focused and controlled. The continuous generations of the microelectric field renders it possible to carry out the continuous measurements relating to the fractures in the investigated wall region 8. The basis of processing the measured data is the sampling, wherein the frequency of sampling is selected to be as high as necessary for ensuring the possibility of producing a complex fracture picture by processing the measured data.

In the basic embodiment of the proposed invention, the method realized ensures the detection of the fractures in the neighborhood of the borehole, with enhancement the presence of the hydraulically conductive open fractures, forming parts of a network of communicating vessels, and with suppression of the data assigned to the closed fractures which are the result of the process of drilling the borehole. This method is realized by the apparatus in its embodiment shown in FIGS. 2, 3 and 3A.

As it can be seen in FIG. 2, the main current generator 15 supplies current (of intensity $I_1$) through the first output measuring resistor 18 and the ring shaped first feeding electrode 9, signed previously also by $A_1$, to the space of the measurements. The first feeding electrode 9 constitutes together with the first output measuring resistor 18 a series member. The current supplied and fed into the hard rock formation comes back to the main current generator 15 over the far return feeding electrode 24 (B). The field generated by the current of intensity $I_1$ results in a control potential difference $U_1$ measurable between the first and second ring shaped monitoring electrodes 11 18 and 12 ($S_1$ and $S_2$). The measured potential difference $U_1$ is given to the control input of the controlled current generator 16 which is a high stability current generator for generating bucking current also with high speed of alteration, if necessary. The controlled current generator 16 produces the bucking current $I_2$ and feeds it into the measurement space over the second output measuring resistor 17 and the second feeding electrode 10 connected in series. The presence of the bucking current $I_2$ results in a countervoltage $\Delta U_2$ ruling between the first and second monitoring electrodes 11 and 12, wherein the magnitude of the countervoltage $\Delta U_2$ is equal to that of the potential difference $\Delta U_1$ but it is of opposite sign. The resulted control potential between the first and second monitoring electrodes 11 and 12 is in this case of near zero value. In the practice, of course, the ideally zero value is not achievable; however, a very low level can be ensured. The low control potential value is the object of this regulation and it can be ensured in a continuous process during the measurements. The sharply focused microelectric field according to the mechanism depicted includes a region of minimal potential level constituting a ring shaped space part within the space limited by the first and second monitoring electrodes 11 and 12. This results in producing a potential barrier by the potential field of the bucking current $I_2$, the potential barrier preventing the flow of the main current $I_1$ in lateral directions along the surface of the measuring pad 6 through the thin mud layer present between the measuring pad 6 and the wall region 8. This potential barrier prevents the lateral current flow in the case if the insulating material of the measuring pad 6 is pressed to a tight wall region. The flow of the bucking current $I_2$ is not excluded also in this case, because of lack of any potential barrier working against the second feeding electrode 10 assigned to the bucking current $I_2$. Hence, the bucking current $I_2$ can find the way of flowing through the thin mud layer to the basic mass of the drilling mud 2 characterized by relatively high electric conductivity. It follows that in the case of investigating a tight wall region in the borehole the bucking current is very high in comparison to the main measuring current $I_1$, i.e., the output 21/2 of the first arithmetic data processing means 21 forwards a fracture indicator $I_1/I_2$ of very low value, practically being equal to zero.

If the investigated wall region 8 of the borehole includes a fracture terminating at the borehole and classified as an open fracture because of remarkable hydraulic conductivity, this fracture traverses the line of the ring shaped feeding and monitoring electrodes 9, 10, 11, 12 and measuring electrode 13. The open fracture comprises electrically conductive liquid constituted generally by the drilling mud penetrating the fracture and in this conditions a current transport from the main current $I_1$ can be observed from the first ring shaped feeding electrode 9 to the space of the measurements and the intensity of the current flow is increased in dependency on the hydraulic conductivity of the open fracture, i.e., the ratio $I_1/I_2$ indicates that a fracture with increased hydraulic conductivity is present. This enhancement of the open fractures is the main object of the dimensionless current ratio $I_1/I_2$ constituting a fracture indicator for open fractures.

This method does not give data referring to the closed fractures which are not important. The closed fractures behave in this method in similar manner &:o the tight wall of the borehole, because they are not capable of giving a continuous way of flowing the main current $I_1$.

For carrying out the measurements, the main ammeter 19 produces a signal with level proportional to the intensity of the main current $I_1$. The signal is forwarded to an input of the first arithmetic data processing means 21 from the first output measuring resistor 18. The auxiliary ammeter 20 forwards from the second output measuring resistor 17, also to the first arithmetic data processing means 21, a signal with level corresponding to the intensity of the bucking current $I_2$. The first arithmetic data processing means 21 generates the ratio $I_1/I_2$ and forwards it through the output 21/2 of the first arithmetic data processing means 21.

At the same time, the unit 22 for measuring voltage difference determines the potential difference $U_{MK}$ between the ring shaped outer measuring electrode 13 (M) and the point-like central electrode 14 (K) and forwards the corresponding signal to a respective input of the first arithmetic data processing means 21. The voltmeter 23 determines the absolute potential $U_K$ of the central electrode 14 taking as basis the potential level of the far reference electrode 25 applied even for voltage measurements (N). This measured value is also forwarded to the first arithmetic data processing means 21, which computes and generates on the output 21/1 a dimensionless second fracture indicator $U_{MK}/U_K$ for detecting both the open and the closed fractures. However, it is to be noted that the second fracture indicator, i.e., the ratio $U_{MK}/U_K$ has values remarkably low in the case of closed fractures and relatively high values if the fracture is open. Similar to the first fracture indicator, i.e., to the ratio $I_1/I_2$, the second indicator has also values increasing with the hydraulic conductivity of the open fractures.

The first arithmetic data processing means 21 computes further a normalized fracture indicator H, which is also a dimensionless parameter and forwarded by the output 21/3 of the first arithmetic data processing means 21. The normalized fracture indicator H is a modified product of the first and second fracture indicators and it can be given by the formula $$H = \left( A \frac{I_1}{I_2} \right)^B \left( \frac{U_{MK}}{U_K} \right)$$

wherein A and B are mathematical constants reflecting the given geophysical conditions. The modified product determined by the formula is capable of enhancing the open fractures from the background of the fractures and giving a signal level according to the hydraulic conductivity. The product has very low value in the case of the closed fractures. This results in a very clear picture of the fractures present in the region of the measurements. The normalized fracture indicator H reflects in a very sensitive manner the hydraulic conductivity of the open fractures and forms an adequate basis for analyzing the hydraulic conditions of the open fractures, a better basis than either the first fracture indicator $I_1/I_2$ or the second fracture indicator $U_{MK}/U_K$ taken separately or together.

The method and apparatus depicted above has a further unexpected advantage, i.e., the absolute potential value $U_K$ measured by the voltmeter 23 and the intensity $I_1$ of the main current measured by the ammeter 19 on the basis of the first output current measuring resistor 18 give a resistivity value which can be identified as apparent microrestivity $R_a$ of the microelectric field generated by the main current. The first arithmetic data processing means 21 forwards on the output 21/4 a logarithmic signal according to the formula $$\log\left(W\frac{U_K}{I_1}\right)$$

The expression $R_a = WU_K/I_1$ with the constant W depending on the downhole measuring tool 1 is a conventional auxiliary parameter facilitating the investigations by reflecting the material of the hard rock formations and by improving the reliability of correlating the fracture indicators H, $I_1/I_2$ and $UM_K/U_K$ of a given depth with other geophysical parameters measured in the same borehole.

By applying the modified circuit diagram shown in FIG. 4 and the pad according to the FIGS. 5 and 5A, it is possible to determine also the geometric configuration of the open fractures reaching the wall of the borehole and the difference of this configuration to the straight line arrangement, i.e., the measurements are capable of giving information on the fractures whether they traverse the hard rock formation along straight, broken or curved lines.

A comparison of the FIG. 4 with FIG. 2 gives evidence of similarity of the majority of the circuit elements shown in the figures mentioned. The way of operating the apparatus according to FIGS. 4, 5 and 5A is generally similar to that of the apparatus described above with reference to the FIGS. 2, 3 and 3A and it is possible to carry out the same operations.

In the apparatus with circuit diagram represented by FIG. 4 and with the pads 6 built up according to FIGS. 5 and 5A the outer measuring electrode 13 is segmented. The number of the segments can be as high as desired, it depends on the technical conditions; The practical results show that the best is to apply from 4 to 24 segments, especially 12 segments—the 12 segment arrangement is shown in FIGS. 4 and 5.

The apparatus built up according to this embodiment carries out potential difference measurements for determining the values $U_{MK,i}$ assigned to the segments 13/1 to 13/n of the outer measuring electrode 13 (n means the number of the segments, in the embodiment shown n=12, and i is the serial number of the segment). The potential difference $U_{MK,i}$ assigned to the i-th segment of the outer measuring electrode 13 is measured by the unit 22/i—the FIG. 4 shows only four of the segments signed by 13/1, 13/j, 13/m and 13/12 connected with measuring units 22/1, 22/j, 22/m and 22/12. The measuring units 22/i are all contacted with respective inputs of the second arithmetic data processing means 26.

The second arithmetic data processing means 26 carries out more operations than the first arithmetic data processing means 21 as it includes more units, i.e., operational elements.

The second arithmetic data processing means 26 receives signals corresponding to the measured potential differences $U_{MK,i}$ and generates in real time mode the mean value $\overline{U_{MK}}$ as part of the ratio $\overline{U_{MK}}/U_K$, wherein $U_K$ is the absolute potential of the central measuring electrode 14 related to the far reference electrode 25. The second arithmetic data processing means 26 produces the average fracture parameter expressed in the form of the following formula:

$$\left(\frac{1}{n}\sum_{i=1}^{n}U_{MK,i}\right)\frac{1}{U_K}$$

The average fracture parameter defined above as $\overline{U_{MK}}/U_K$ is a very good approximation of the fracture indicator $U_{MK}/U_K$ defined above with reference to the embodiment of the apparatus according to the invention shown in FIGS. 2, 3 and 3A, i.e., the embodiments defined above are capable of ensuring the same parameters. The average fracture parameter is forwarded further by the output 26/1 of the second arithmetic data processing means 26. Of course, the mentioned means are capable of generating the second fracture indicator $I_1/I_2$ defined above (forwarded by the output 26/2, and the normalized fracture indicator in modified form:

$$H' = \left(A\frac{I_1}{I_2}\right)^B \left(\frac{U_{MK}}{U_K}\right)$$

(forwarded by the output 26/3) and the logarithmic apparent microesistivity log $R_a = \log (WU_K/I_1)$ (forwarded by the output 26/4), as well. The mentioned parameters are computed and forwarded in real time mode and they can be stored and applied for creating a full picture of the borehole environment, if they are assigned to different depth levels in the borehole.

For determining the geometric arrangement of the open fractures, the second arithmetic data processing means 26 produces in real time mode and stores the elementary fracture indicators $U_{MK,i}/U_K$ forming ratios of the potential differences measured for the i-th segment and of the absolute potential $U_K$ measured by the central electrode 14. These elementary fracture indicators are forwarded by the output 26/5. The second arithmetic data processing means 26 selects in real time or off-line mode the two maxima values from the measured elementary indicators, if they are not assigned to two adjacent segments. In the example of FIG. 4, the segments so selected are 13/j and 13/m. The maximal elementary fracture indicators $U_{MK,j}/U_K$ and $U_{MK,m}/U_K$ forwarded on the outputs 26/6 and 26/7 of the second arithmetic data processing means 26. The selected values are also stored together with data necessary for identifying the place of determining them.

The series of the elementary fracture indicators $U_{MK,i}/U_K$ measured versus depth of the borehole and the selected local maximum values $U_{MK,j}/U_K$ and $U_{MK,m}/U_K$ form an adequate basis for determining the geometric network of the open fractures reaching the wall of the borehole including the determination of the directions of the fractures—they can stretch along broken and curved lines, occasionally along straight lines. The determination of the geometry of the fracture network is generally carried out in off line mode, after completing the measurements and collecting all necessary data and parameters. This process of determining is a normal object for a computer system.

Turning now to FIG. 6, it can be seen how more measurements can be completed simultaneously along the circumference of the borehole. The Figure shows a four pad measuring arrangement. The focused microelectric field is in this case generated in four different places and the simultaneous measurements must not interfere one with another if the reliability of the measured parameter should be ensured.

According to the invention, the proposed method of simultaneous measurements is carried out utilizing the known multi-frequency system by applying four different frequency values signed by $f_1$, $f_2$, $f_3$, and $f_4$ and selected advantageously in the frequency range 60–1000 Hz for eliminating industrial and telluric current noises below 60 Hz and skin effect (eddy current) disturbances above 1000 Hz. The four frequency values assigned to the four pads arranged at the wall of the borehole should differ one from the other with a frequency distance which is as high as necessary for avoiding the interference. Let the frequency increase with the indices: $f_1 < f_2 < f_3 < f_4$. They are assigned to the pads as shown in FIG. 6. The frequency difference $f_2-f_4$ between the adjacent pads 6/2 and 6/3 and $f_1-F_3$ between the neighboring pads 6/3 and 6/4 can be selected to be relatively big in order to ensure the independency of the microelectric fields generated in a controlled manner for carrying out the measurements. It seems to be an interference problem between the neighboring pads 6/4 and 6/1 because of applying the adjacent frequency values $f_2$ and $f_3$ the problem can be avoided and no interference problem occurs.

The more pad system applied according to FIG. 6 is not specific to the construction of the measuring pads 6. There is no difference, whether the measuring pads 6/1, 6/2, 6/3 and 6/4 are constructed according to FIG. 2, 4 or 7, with electrode systems according to FIGS. 3, 3A 5, 5A or 7. In all cases the measured data are processed by the corresponding arithmetic data processing means in real time mode and stored versus depth defined along the axis of the borehole. During the measurements the real time display of the measured data is generally realized only in connection with one of the pads 6, e.g., the pad 6/1, capable of determining the fracture indicators $(_1/I_2)_1$, $$\left( \sum_{i=1}^{n} I_{1,i}/I_2 \right)_1^B \left( \frac{U_{MK}}{U_K} \right)_1, \left( \frac{U_{MK}}{U_K} \right)_1$$

and $(H)_1$, $(H')$, further the apparent microresitivity values expressed in logarithmic forms:

$$\log \left( W \frac{U_K}{I_1} \right)_1 \text{ and } \log \left( \frac{W U_K}{\sum_{i=1}^{n} I_{1,i}} \right)_1$$

The mentioned values can be displayed during the measurements and they illustrate the fracture conditions ruling in the borehole.

The parameters measured on the different pads in a real time mode are stored and in an off-line arrangement, they can be applied for determining the image of the network of the open fractures reaching the circumference of the borehole The determination of the continuous picture of the fracture network can be carried out by applying a specific software forming no part of the present invention.

In a further embodiment of the present invention the geometry of the open fractures reaching the wall of the borehole is determined by the measurement of elementary current intensities $I_{l,i}$ (i means an integer from 1 to n) characterizing the segments of the first feeding electrode 9 divided into n segments. In this embodiment, it is possible to determine the thickness of the mud layer present between the pad of the downhole measuring tool 1 and the wall of the borehole (rugosity) or the thickness of the mudcake, moreover to differentiate the mudcake of uniform thickness from the rugosity of uneven thickness. This embodiment of the proposed method is carried out by the apparatus with circuit diagram shown in FIG. 7 having also an expanded complex arithmetic data processing means 28 according to FIG. 8.

Turning now to FIGS. 2, 4 and 7, it is clear that the most of the elements are common and they do not require further explanation which repeats only the aforesaid In the case of the apparatus built up according to the FIG. 7 the elements common with the apparatus according to FIG. 2 or 4 are operated in the same way.

In the apparatus of the invention realized with the circuit diagram shown in FIG. 7, the main difference in comparison with the embodiments previously described lies in the application of the segmented first feeding electrode 9 for supplying the main current. The number of the segments applied is not specific, it depends on the given conditions. According to the practice, the most advisable is to divide the first feeding electrode 9 into 4 to 24 segments, preferably into 12 segments as it is shown in FIG. 7. The apparatus determines the current intensities $I_{l,i}$ for each of the segments 9/i, wherein i=1 to n, and n means the number of the segments In this measurement, the first output current measuring resistors 18/i (18/1, 18/j, 18/p, 18/12) are applied. One of the poles of the first output measuring resistors 18/i is contacted through a common conductor to the main current generator 15—this ensures a common potential for each segment 9/i (9/1, 9/j, 9/p, 9/12) of the first feeding electrode (ring $A_1$). The ammeters 19/i (19/1, 19/j, 19/p, 19/12) measure the current intensities in the segments of the ring $A_1$ and the segment current intensities $I_{l,i}$ are forwarded to the required input terminals of the third arithmetic data processing means 27 The further input terminals of the third arithmetic data processing means 27 receive the following data: intensity $I_2$ of the bucking current measured through the low resistivity second output current measuring resistor 17, the voltage difference $U_{MK}$ measured by the unit 22 between the first and second monitoring electrodes 13 and 14, the absolute potential value $U_K$ measured between the central electrode 14 and the far reference electrode 25 by the voltmeter 23.

The parameters measured and forwarded to respective inputs of the third arithmetic data processing means 27 are transformed in a real time process and the following dimensionless ratios are determined and transmitted through the respective outputs: fracture indicators $U_{MK}/U_K$, $I_{1,1}/I_2, \ldots, I_{1,j}/I_2, \ldots, I_{1,2p}/I_2, \ldots, I_{1,12}/I_2$ together with the serial numbers of the segments of the first feeding electrode, the normalized sum $$A \sum_{i=i}^{n} \frac{I_{1,i}}{I_2}$$

of the segment current intensities, the modified fracture indicator $H''$ formed on the basis of the first fracture indicator and the sum mentioned according to the formula $$H' = A\left(\sum_{i=1}^{n} \frac{I_{1,i}}{I_2}\right)^B \frac{U_{MK}}{U_K}$$

which determines the hydraulic conductivity of the fractures, and the logarithmic apparent resistivity expressed by the formula $$\log R_a = \log W \frac{U_K}{\sum_{i=1}^{n} I_{1,i}}$$

The mentioned parameters are measured and computed in a continuous process during logging with the downhole measuring tool 1. They are also stored immediately after computing. The first fracture indicator $U_{MK}/U_K$, the mentioned sum of the segment current intensities, the modified fracture indicator $H''$ can be registered also versus depth, wherein the momentary position of the downhole measuring tool 1 is registered, too.

In FIG. 8 a very schematic representation of a complex arithmetic data processing means 28 is shown in contact with the outputs 27/1 to 27/8 of the third arithmetic data processing means 27 shown in FIG. 7. The complex means 28 receives the output signals of the third arithmetic data processing means and forwards on the output 28/1 a signal corresponding to the normalized average value of the segment current intensities according to the formula $$\frac{\overline{I_{1,i}}}{I_2} = \frac{1}{n} \sum_{i=i}^{n} I_{1,i}/I_2$$

on the output 28/2 the normalized differences of the segment current intensities from the average value according to the formula $$\frac{I_{1,i} - \overline{I_{1,i}}}{I_2}$$

for each of the segments, on the outputs 28/3, 28/4, 28/5 and 29/6 those of the mentioned normalized differences (at most four with serial number e.g., j, m, p and v) which exceed a predetermined threshold value E together with the corresponding serial numbers of the segments, i.e., the values $$\frac{I_{1,w} - \overline{I_{1,i}}}{I_2}$$

wherein $w = j, m, p, v$. the outputs 28/3, 28/4, 28/5 and 6 forward signals for determining the direction and the network geometry of the fractures. A further fracture indicator of improved informative content signed previously by $H_e$ is generated and forwarded through the output 28/7 according to the formula $$H_2 = \left(A \frac{I_{1,j} + I_{1,m} + I_{1,p} + I_{1,v}}{I_2}\right)^B \left(\frac{U_{MK}}{U_K}\right)$$

for determining the hydraulic conductivity of the fractures. If the comparison results in the consequence that there is no fracture indicator exceeding the threshold value E, then the output 28/8 is applied for signaling the lack of any fractures on the place of the investigation. This output is applied also for forwarding the thickness $t_m$ of the rugose mud layer present between the insulating pad 6 and the tight wall of the borehole or of the mudcake present in the borehole The thickness $t_m$ can be determined on the basis of a functional dependency between the thickness $t_m$ and the ratio $\overline{I_{1,i}}/I_2$ and this is also an object of the complex arithmetic data processing means 28. If the output 28/8 is active, the complex arithmetic data processing means 28 is applied also for testing whether the normalized current differences $(I_{1,i} - \overline{I_{1,i}})/I_2$ forwarded on the output 28/2 for each segment ($i = 1$ to n) exceed a predetermined second threshold value w or not. If all normalized current differences are greater than this second threshold value w, then output 28/9 signalizes the presence of a mud layer between the rugose wall of the borehole and the insulating measuring pad 6; in opposite case, if the normalized current differences all are smaller than the second threshold value w, then the output 28/9 is applied for signalizing that on the wall of the borehole there is a mudcake on the place investigated. The complex arithmetic data processing means 28 operates in off-line mode and include storage means for receiving the data from the outputs. The output data are applied for creating a display about the geometric arrangement of the fractures in the network, the geometric arrangement is determined generally versus depth along the axis of the borehole. The modified fracture indicator $H_e$ (output 28/7) the thickness $t_m$ of the mud layer or mudcake (output 28/8) and the specific characteristic data forwarded by the output 28/9 are generally illustrated in function of the depth, depending on the position of the downhole measuring tool 1.

In FIG. 9 creating of the dimensionless ratios $U_{MK}/U_K, I_1/I_2$ and H designated by 21/1, 21/2 and 21/3, respectively in FIG. 2 is shown. In this figure section B is in a tight hard rock formation with even wall of borehole; its identifying is performed by the near-to-zero level of the created ratio $U_{MK}/U_K$, very low level of the created ratio $I_1/I_2$ and by near-to-zero level of the created compounded ratio H. Section C is in a tight hard rock formation with uneven rugose wall of borehole; its identifying is performed by near-to-zero level of the ratio $U_{MK}/U_K$, moderate varying level of the ratio $I_1/I_2$ and by low level of the compounded ratio H. Differentiating the rugose wall of borehole in section C from the even wall of borehole in section B is provided by the moderate varying level of the ratio $I_1/I_2$ in section C and by the comparatively very low level of ratio $I_1/I_2$ in section B.

In section D a closed fracture occurs in the wall of borehole, its identification is performed by a small spike of low amplitude of the ratio $U_{MK}/U_K$, low level of the ratio $I_1/I_2$ and by a small spike of low amplitude of the compounded ratio H. In section E an open fracture enters the wall of borehole; its identifying is performed by large spikes of high amplitudes of all the ratios $U_{MK}/U_K, I_1/I_2$ and H, respectively. Differentiating the open fracture in section E from the closed fracture in section D is provided by the large spike of high amplitudes of all the ratios $U_{MK}/U_K, I_1/I_2$ and H in section E and by the comparatively small spikes of low amplitudes of ratios $U_{MK}/U_K$. H and by the low level of ratio $I_1/I_2$ in section D.

The method according to the invention realized by the novel arrangements shown in FIGS. 1 to 9 is capable of carrying out the following:

1. measuring, indicating the hydraulically conductive open fractures and differentiating them from the nonconductive closed fractures;
2. measuring and determining the geometric arrangement of the open, hydraulically conductive fractures by recognizing and allowing for their broken and curved line shapes;
3. measuring and determining—on the hard rock wall regions without open fractures—the thickness of a rugose mud layer or a mudcake precipitated on the wall of the borehole, further differentiating the regions covered by the mudcake from the regions with uneven, rugose wall surface formations, the rugose mud layer being present between the insulating material of the measuring pad and the wall of the borehole;
4. measuring and determining fracture indicators H, H', H" or M and the fracture indicators $H_e$ and $M_e$ of improved informative content whereby the hydraulic conductivity of the open fractures can be measured on the places of the investigation;
5. applying in a multiplicative way the features mentioned above, i.e., carrying out simultaneous measurements in different points along the circumference of the borehole and obtaining thereby a more complex image of the open fractures present at the wall of the borehole.

What we claim is:

1. A microelectric method of logging open and closed fractures in a hard rock formation pierced by a borehole, comprising the steps of pressing at least one measuring pad made of insulating material to a region to be investigated in a borehole drilled in a hard rock formation, said pad including metallic feeding and measuring electrodes to contact said region;

generating a controlled microelectric field penetrating said hard rock formation by means of currents supplied by first and second feeding electrodes, measuring by means of said measuring electrodes current and potential conditions created by said first and second feeding electrodes and identifying on the basis of said measured conditions hydraulically conducting open fractures and closed fractures of low hydraulic conductivity present in said hard rock formation, wherein said first feeding electrode is a ring shaped electrode arranged concentrically around a point-like central measuring electrode, said first feeding electrode supplying a main current into said region, said second feeding electrode is a ring shaped electrode arranged around said first feeding electrode supplying a bucking current into said region, said measuring electrodes include two monitoring electrodes arranged between said first and second feeding electrodes, said monitoring electrodes measuring a control potential, said bucking current is regulated in order to ensure a value as low as possible for said control potential measured between said monitoring electrodes, said main current, said controlled bucking current, the potential difference between said central measuring electrode and an outer measuring electrode surrounding said central measuring electrode, said outer measuring electrode being inside said first feeding electrode, and the absolute value of the potential of the central measuring electrode is measured, said central measuring electrode, said outer measuring electrode, said first feeding electrode, said two monitoring electrodes and said second feeding electrode forming a substantially concentric electrode system, indicative dimensionless ratios of said currents and of said measured potentials are formed and said open and closed fractures are identified and differentiated on the basis of said dimensionless ratios measured in a substantially continuous process during movement of said at least one measuring pad along the axis of said borehole, said open fractures having greater values of said dimensionless rations than said closed fractures.

2. The method as set forth in claim 1, comprising the step of creating the dimensionless ratios $I_1/I_2$, $U_{MK}/U_K$ and a normalized product thereof in the form of $$H = \left(A\frac{I_1}{I_2}\right)^B \left(\frac{U_{MK}}{U_K}\right)$$

wherein $I_1$ means said main current, $I_2$ said bucking current, $U_{MK}$ the potential difference between said central electrode and said outer measuring electrode, $U_K$ is the absolute potential in the place occupied by said central electrode and A and B are mathematical constants determined by known optimizing regression analysis determined by the given geophysical conditions of said hard rock formation.

3. The method as set forth in claim 1, comprising the further steps of dividing said outer measuring electrode into at least 4, and at most into 24 segments, measuring the potential difference $U_{MK,i}$ with respect to said central measuring electrode for each segment, wherein i means the serial number of said segments with integer values i=1 to n, creating dimensionless ratios $U_{MK,i}/U_K$, where $U_K$ means the absolute potential of said central measuring electrode, selecting the two maximal values from said dimensionless ratios $U_{MK,i}/U_K$ with serial numbers i differing by more than one, carrying out determination of said dimensionless ratios in a substantially continuous way along the axis of said borehole by translating said at least one measuring pad in said borehole and determining the direction of traversing the surface of said measuring pad by the open fracture on the basis of more measurements.

4. The method as set forth in claim 3, comprising the step of computing an average value $$\frac{U_{MK}}{U_K} = \frac{1}{n} \sum_{i=1}^{n} \frac{U_{MK,i}}{U_K}$$

on the basis of the dimensionless ratios $U_{MK,i}/U_K$, creating the dimensionless ratio $I_1/I_2$ and a normalized product H' of said average value and said dimensionless current ratio according to the formula $$H' = \left(A\frac{I_1}{I_2}\right)^B \left(\frac{U_{MK}}{U_K}\right)$$

for differentiating the closed fractures from the open fractures.

5. The method as set forth in claim 3, comprising the step of dividing the outer measuring electrode into 12 segments.

6. The method as set forth in claim 1, comprising the further steps of carrying out simultaneous measurements in at least 2, at most 8 regions determined along the circumference of the borehole, applying during the measurements features preventing interference between the result of said simultaneous measurements and creating a full image of the fracture network in the wall of said borehole along the axis of the borehole.

7. The method as set forth in claim 6, comprising the step of carrying out said simultaneous measurements by means of measuring pads connected with supply units forwarding currents of different frequency values to each pad for preventing interference.

8. The method as set forth in claim 6, comprising the step of carrying out said simultaneous measurements in 4 regions along the circumference of the borehole with measuring pads arranged at respective ends of two perpendicular diameter of the cross section of said borehole.

9. The method as set forth in claim 1, comprising the further steps of dividing said first feeding electrode into at least 4, at most 24 separate segments, connecting said segments to a common potential, measuring the elementary currents $I_{1,i}$ of said segments, wherein i means the serial number of the segments in the range $i=1$ to n, comparing said elementary currents $I_{1,i}$ to said bucking current $I_2$ and creating an elementary fracture indicator $I_{1,i}/I_2$ for each of said segments for determining the direction of a current transport through a mudcake present between said measuring pad and the wall region to be investigated in said borehole, selecting at most four of said elementary fracture indicators belonging to said segments, the four elementary fracture indicators with maximal values and having serial numbers j, m, p, v, said segments being separated one form another by at least one of said segments, determining the directions between the segments with serial number j and p, further m and v, the angle position of the lines connecting said segments with serial numbers j, p, m and v to said central measuring electrode, transporting the measuring pad along the wall of said borehole and analyzing the results of measurements carried out continuously.

10. The method as set forth in claim 9, comprising the further steps of determining the mean value $\overline{I_{1,i}}$ of the elementary fracture indicators $I_{1,i}$, then computing the difference ratios $(I_{1,i}-\overline{I_{1,i}})/I_2$ for each segment and selecting from the difference ratios at most four exceeding a predetermined threshold E and having serial numbers j, m, p, v, creating a modified fracture indicator $H_e$ according to the formula $$H_e = \left( A \frac{I_{1,j} + I_{1,m} + I_{1,p} + I_{1,v}}{I_2} \right)^B \frac{U_{MK}}{U_K}$$

and determining the hydraulic conductivity of the open fractures on the basis of said modified fracture indicator $H_e$ at the place of the investigation.

11. The method as set forth in claim 9, comprising the further steps of checking the computed difference ratios $(I_{1,i}-\overline{I_{1,i}})/I_2$ for each segment and detecting presence of an uneven mud layer of a mudcake between said measuring pad and the wall of said borehole on the basis of the magnitude of said computed difference ratios when all remaining under the predetermined threshold E and defining thickness of the mudcake or uneven mud layer on the basis of the value $I_{1,i}/I_2$.

12. A microelectric logging apparatus for measuring and differentiating between open and closed fractures in a hard rock formation pierced by a borehole, comprising at least one measuring pad arranged on an arm of a downhole measuring tool, said measuring pad made of insulating material and comprising electrodes including a point-like central measuring electrode and a ring shaped outer measuring electrode surrounding said central measuring electrode, said outer measuring electrode surrounded by a first feeding electrode providing a main current and a second feeding electrode providing a bucking current, a first and a second monitoring electrode disposed between said first feeding electrode and said second feeding electrode, wherein said first and second monitoring electrodes are connected to respective inputs of a controlled current for supplying said bucking current through said second feeding electrode maintaining a near-zero potential difference between said first and second monitoring electrodes, said first feeding electrode being connected to a main current generator supplying said main current, said point-like central measuring electrode and said ring shaped outer measuring electrode being connected to the input of a voltage difference measuring unit, said point-like central measuring electrode also being connected to an absolute voltage measuring voltmeter.

13. The apparatus as set forth in claim 12, wherein said outer measuring electrode is divided into ring segments and said ring segments are connected to voltage difference measuring units.

14. The apparatus as set forth in claim 12, wherein said first feeding electrode is divided into segments connected over respective output current measuring resistors to the main current generator and to ammeters for measuring the elementary main currents, wherein the segments are connected to a common potential.

15. The apparatus as set forth in claim 12, comprising at least four, at most twenty four, segments in either of the first current feeding electrode and the outer measuring electrode.

16. The apparatus as set forth in claim 12, comprising means for supplying currents of different frequency values to different measuring pads, wherein the number of the measuring pads is at least two and at most eight.

17. A method of detecting and differentiating between open and closed fractures in a hard rock stratum pierced by a liquid containing borehole comprising the steps of:

a) insulating a region of a wall of said borehole from said liquid;

b) applying two opposing currents within said region by means of concentric source electrodes;

c) measuring a control potential between said concentric source electrodes;

d) regulating one of said opposing currents to obtain a minimum valve for said control potential;

e) measuring both currents;

f) measuring the potential between a central point-like measuring electrode, concentric with said source electrodes, and an outer measuring electrode, said outer measuring electrode within and concentric with said source electrodes, g) measuring the absolute value of the potential at said central point-like measuring electrode;

h) forming dimensionless ratios of the measurements taken; and i) comparing said dimensionless ratios to determine the presence of fractures and to differentiate open fractures from closed fractures.

18. A method of detecting and differentiating between open and closed fractures in a hard rock stratum pierces by a liquid containing borehole as claimed in claim 17 further comprising the steps of:
- j) insulating a second region of said wall of said borehole from said liquid;
- k) applying two additional opposing currents within said second region by means of second concentric source electrodes, said additional opposing currents being of a different frequency than the first opposing currents;
- l) measuring a second control potential between said second concentric source electrodes;
- m) regulating one of said additional opposing currents to obtain a minimum value for said second control potential;
- n) measuring both additional opposing currents;
- o) measuring the potential between a second central point-like measuring electrode, concentric with said second source electrodes, and a second outer measuring electrode, said second outer measuring electrode within said concentric with said second source electrode;
- p) measuring the absolute value of the potential at said second central point-like measuring electrode;
- q) forming additional dimensionless ratios of the measurement taken from said second region;
- r) comparing said additional dimensionless ratios to determine the presence of fractures and to differentiate open fractures from closed fractures; and
- s) correlating the presence and type of fractures between said region and said second region.

* * * * *

UNITED STATES PATENT AND TRADEMARK OFFICE
CERTIFICATE OF CORRECTION

PATENT NO. : 5,049,822

DATED : September 17, 1991

INVENTOR(S) : BARLAI et al.

It is certified that error appears in the above-identified patent and that said Letters Patent is hereby corrected as shown below:

On the title page, under
United States Patent (19), should read:

--Barlai et al.--

Signed and Sealed this

Twenty-seventh Day of April, 1993

Attest:

MICHAEL K. KIRK

*Attesting Officer*  Acting Commissioner of Patents and Trademarks